May 30, 1961 H. H. SHARKEY 2,986,336
FOGGING MACHINE
Filed Sept. 29, 1958
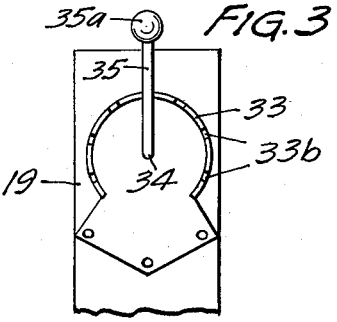
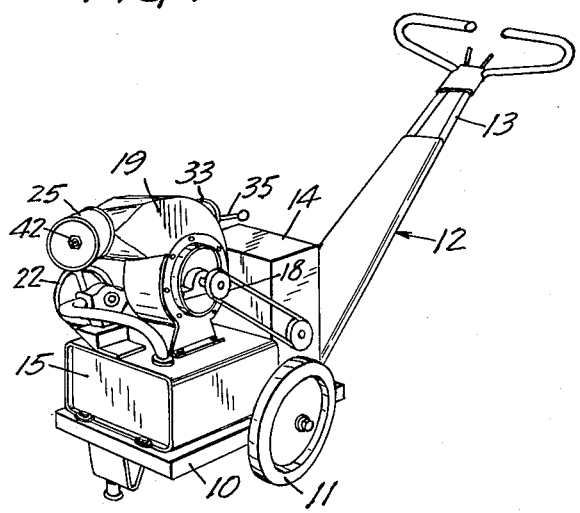
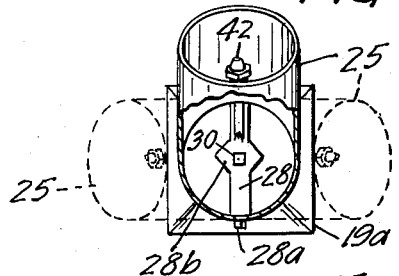
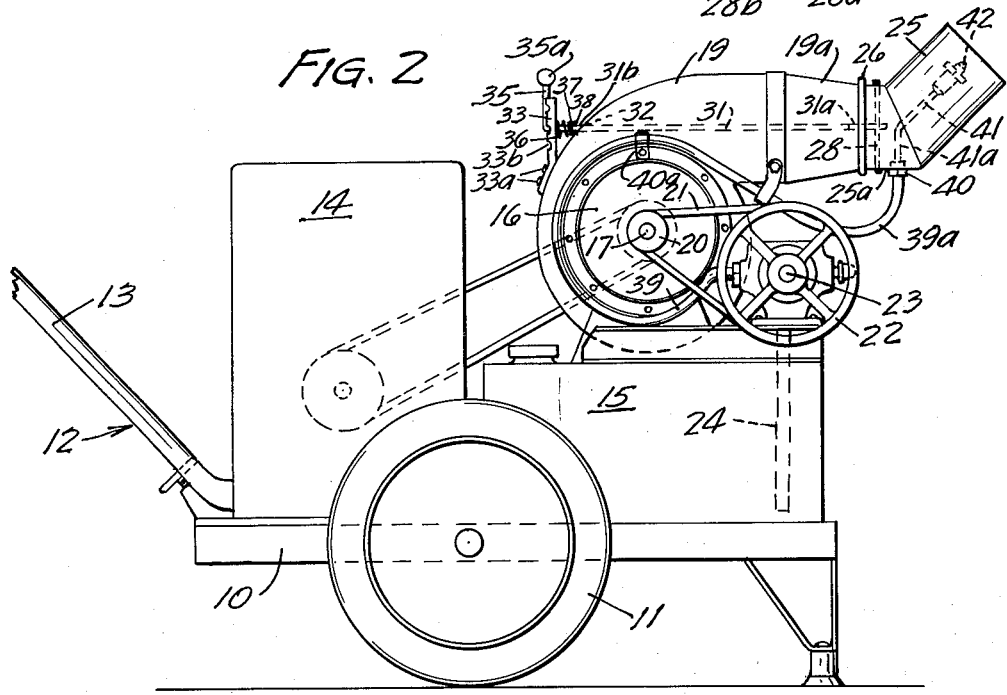
INVENTOR
HARRY H. SHARKEY
BY
Williamson, Schroeder, & Palmatier
ATTORNEYS United States Patent Office 2,986,336
Patented May 30, 1961

2,986,336
FOGGING MACHINE
Harry H. Sharkey, Clarkfield, Minn.
Filed Sept. 29, 1958, Ser. No. 763,981
2 Claims. (Cl. 239—77)

This invention relates to fogging apparatus, and more specifically relates to a machine for applying liquid insecticides and the like to yards, bushes, gardens and the like.

Although fogging machines have been known in the past, most such fogging machines have had several disadvantages, and an important disadvantage in most fogging machines is the means for directing the fog in one direction or another.

An object of my invention is to provide a new and improved fogging machine of simple and inexpensive construction and operation.

Another object of my invention is the provision of a novel and improved fogging machine wherein a rotary air nozzle is readily and easily controlled by mechanism completely concealed and confined against damage except for the operating handle which is conveniently disposed for ready and easy manipulation.

These and other objects and advantages of my invention will more fully appear from the following description made in connection with the accompanying drawings wherein like reference characters refer to the same parts throughout the several views and in which:

Fig. 1 is a perspective view of the invention;

Fig. 2 is a side elevation view with part of the handle structure broken away;

Fig. 3 is a detail elevation view of the handle-positioning bracket and handle;

Fig. 4 is a detail end elevation view, partly in section, of the nozzle;

Fig. 5 is a detail section view showing the relationship between the air nozzle and the blower housing; and Fig. 6 is a detail plan view showing the means by which the rod-holding bar is secured to the air nozzle.

One form of the present invention is shown in the drawings and is described herein. A frame structure 10 is provided for supporting the machine thereon and the frame has a pair of ground-travel wheels 11 journalled on a suitable axis for facilitating movement of the machine over a lawn or the like. A combined source of power and handle unit 12 is attachable to the frame 10 for supplying power to facilitate steering and manual manipulation of the frame structure 10 for guiding the fogger along the ground. The unit 12 has a handle structure 13 and gasoline engine 14 and the handle and engine are both connected to a sub-frame which is removable from the frame structure 10 and is applicable to other types of implements such as lawn mowers and the like. The fogging machine includes a tank 15 which is mounted on the frame structure 10 by any suitable means and the tank 15 is constructed of relatively heavy material so as to form a mounting or support for a blower 16 which has a central shaft 17. A pulley 18 on one end of the shaft will be connected by means of a belt to the engine 14 for driving the fan and causing air to be directed through the housing 19 of the fan structure 16.

On the other end of shaft 17, another pulley 20 is provided and is connected by means of a belt 21 to a larger pulley 22 which is on the drive shaft of a liquid pump 23 to which is connected the conduit or hose 24, the lower end of which projects down into the tank 15 to supply liquid insecticide or the like. It will be noted that the forward end portion 19a of the fan housing projects in a substantially horizontal and forward direction, and a rotatable air nozzle 25 is mounted on the housing 19a. The forward end of the annular fan housing 19a is provided with an outturned annular flange or bead 26, and a bead 27 is provided on the nozzle 25 in interfitting relation with the annular flange 26 to permit the nozzle 25 to rotate about the horizontal and forwardly projecting axis.

It will be noted that the nozzle 25 is angularly formed with the axis thereof oriented at approximately 45° with respect to the rotation axis of the nozzle. It will be seen that when the air nozzle 25 is turned to one side or the other side, the air will be directed in a horizontal direction, but outwardly toward one side of the machine or the other. When the nozzle 25 is pointed forwardly and upwardly, the air is directed to a maximum of height and the maximum of range is also obtained.

Means are provided for controlling the orientation of the nozzle 25 and in the form shown, a bar 28 is positioned in the nozzle and inwardly from the forward end thereof and adjacent the rear end thereof at the horizontally oriented portion 25a thereof. The ends 28a of the bar 28 are inserted through suitably provided correspondingly shaped apertures 29 in the nozzle 25, and the ends 28a are twisted on the exterior side of the nozzle to hold the bar 28 in the predetermined fixed position with respect to the nozzle 25. The bar 28 may have an enlarged central portion 28b, and a square aperture 30 is provided substantially at the center of the nozzle and at a position concentric with respect to the annular flange 26 and the bead 27 so as to be oriented on the rotation axis of the nozzle 25.

An elongate shaft 31 projects longitudinally through the upper fan housing 19 and has a square end 31a thereon which is removably mounted in the aperture 30 of the cross bar 28. The rear end portion 31b of the shaft 31 projects outwardly to a suitable bearing aperture 32 in the rear end of housing 19. An upright bracket plate 33 is affixed to the housing as by screws 33a and has a central aperture 34 through which projects the shaft 31. The rear portion of the shaft 31 is bent at right angles to form a handle or manual control 35 which may be provided with a suitable control knob 35a on the upper end thereof. A spring 36 surrounds the shaft 31 and has one end bearing against the forward surface of the bracket plate 33 and the other end of spring 36 bears against a washer 37 on the shaft 31 which is retained by means of a cotter key 38. The spring 36 continuously urges the shaft 31 in a forward direction so as to prevent removal of the shaft from the housing 19 and from the air nozzle control bar 28. The handle portion 35 is receivable in any of a number of recesses 33b in the bracket plate 33 for holding the handle and shaft and nozzle 25 in a predetermined orientation.

Means are provided for introducing a spray of liquid insecticide into the stream of air being discharged from the nozzle 25, and in the form shown, an outlet conduit or hose 39 is connected with the outlet of the pump 23, and the hose 39 is carried on the housing by means of a plurality of straps 40a, and the forward end portion 39a of the hose is provided with a loop of slack and is then connected with a pipe fitting 40. A rigid conduit or pipe 41 is affixed in the rigid nozzle 25 and the inlet portion 41a thereof projects radially inwardly from the fitting 40 in alignment with the nozzle control bar 28 to a position at approximately the center of the nozzle 25, and then the conduit 41 angles forwardly in a concentric position with respect to the nozzle 25, and a liquid spray nozzle 42 is provided at the forward end of the conduit 41 closely adjacent the outer discharge end of nozzle 25 so that the cone of liquid spray projected therefrom will not engage the periphery of the air nozzle 25.

In operation, the engine 14 is started so as to rapidly revolve the shaft 17 which causes the fan to operate and causes power transmission to the pump 23 for directing a quantity of liquid insecticide or the like from the tank 15 through the conduit or hose 40 and to the spray nozzle 42. Depending upon the nature of the work being done, the air nozzle 25 will be oriented in a suitable direction, either to one side of the machine or the other side or in a generally upward direction or a generally downwardly and forwardly direction. A stream of air flowing outwardly through the air nozzle 25 will carry the misted liquid which is ejected from the spray nozzle 42 and the misted insecticide or the like will be supplied to the shrubs or trees or lawn.

It should be understood that the use of the present invention is not limited to insecticides, but other types of chemicals may also be supplied through the use of the present invention.

It will, of course, be understood that various changes may be made in the form, detail, arrangement and proportion of the parts without departing from the scope of my invention which consists of the matter described herein and set forth in the appended claims.

What is claimed is:

1. A fogging machine comprising an ambulent supporting structure having a rearwardly disposed handle, a source of air pressure on the supporting structure and including a housing having an upper portion with a substantially horizontally oriented air discharge conduit extending in a forward direction and also having a rear wall, an air nozzle at the forward end of said conduit and having a discharge end oriented obliquely with respect to the discharge conduit, the conduit and air nozzle having an annular flange and bead rotary interconnection therebetween to facilitate orienting the air nozzle at multiple positions with respect to the rotation axis whereby to discharge air in multiple oblique directions, a rotary shaft in the conduit and extending along the horizontal longitudinal axis thereof and having a square forward end projecting forwardly to the air nozzle and also having a rear end portion projecting rearwardly through said rear wall, a cross bar in the nozzle and having its ends fixed to the nozzle wall and also having a central portion with a square, shaft-receiving aperture substantially on the rotation axis of the nozzle and providing a non-rotatable connection between the nozzle and shaft, a control handle on the rear end of the shaft and extending transversely thereof, a bracket plate forwardly of the handle and mounted on said wall and having handle-receiving notches at arcuately spaced positions for retaining the shaft in any of a plurality of positions, and a spring on the shaft in front of the bracket plate and bearing against the bracket plate to urge the shaft forwardly for retaining the handle in one of said notches and maintaining the front end of the shaft in assembly with said cross bar, and means for introducing a spray of liquid chemical or the like into the nozzle adjacent the discharge end thereof.

2. A fogging machine, comprising an ambulent supporting structure having a rearwardly disposed handle, a source of air pressure on the supporting structure and including a housing having an upper portion with a substantially horizontally oriented air discharge conduit extending in a forward direction and also having a rear wall, an air nozzle at the forward end of said conduit and having a discharge end oriented obliquely with respect to the discharge conduit, the conduit and air nozzle having rotary, air-confining interconnection means therebetween to facilitate orienting of the air nozzle at multiple positions with respect to the rotation axis whereby to discharge air in multiple oblique directions, a rotary shaft in the conduit and extending along the horizontal longitudinal axis thereof and having a non-circular forward end projecting forwardly to the air nozzle and also having a rear end projecting rearwardly through said rear wall, a cross bar in the nozzle and having its ends fixed to the nozzle wall and also having a central portion with a shaft-receiving aperture of complementary shape with respect to said forward end of the shaft and substantially on the rotation axis of the nozzle and providing a non-rotatable connection between the nozzle and shaft, a control handle on the rear end of the shaft and extending transversely thereof, a bracket plate forwardly of the handle and mounted on said wall and having handle-receiving notches at arcuately spaced positions for retaining the shaft in any of a plurality of positions, and a spring on the shaft in front of the bracket plate and bearing against the bracket plate to urge the shaft forwardly for retaining the handle in one of said notches and maintaining the front end of the shaft in assembly with said cross bar, and means for introducing a spray of liquid chemical or the like into the nozzle adjacent the discharge end thereof.

References Cited in the file of this patent

UNITED STATES PATENTS

| | | |
|---|---|---|
| 2,661,239 | Tirrell | Dec. 1, 1953 |
| 2,677,576 | Brann | May 4, 1954 |